United States Patent
Yoshikawa et al.

(10) Patent No.: US 6,580,193 B2
(45) Date of Patent: Jun. 17, 2003

(54) ROTARY ELECTRIC MACHINE AND MANUFACTURING METHOD THEREFOR

(75) Inventors: Shouichi Yoshikawa, Hoi-gun (JP); Yasushi Ueda, Toyohashi (JP); Yoshiaki Matsuura, Kosai (JP); Yoshiyuki Matsushita, Toyohashi (JP); Kouji Niimi, Okazaki (JP); Sumiyoshi Kamogawa, Inasa-gun (JP); Atsushi Tariki, Hamamatsu (JP); Takayoshi Sasaki, Hamana-gun (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/801,709

(22) Filed: Mar. 9, 2001

(65) Prior Publication Data

US 2002/0047457 A1 Apr. 25, 2002

(30) Foreign Application Priority Data

Mar. 31, 2000 (JP) .................................. 2000-097652

(51) Int. Cl.⁷ .............................................. H02K 3/34
(52) U.S. Cl. ........................ 310/215; 310/216; 310/218
(58) Field of Search .................................. 310/215, 214, 310/216, 217, 218, 194, 65, 172, 173

(56) References Cited

U.S. PATENT DOCUMENTS

| | | | |
|---|---|---|---|
| 4,818,911 A | | 4/1989 | Taguchi et al. |
| 5,698,923 A | * | 12/1997 | Scherzinger et al. ........ 310/194 |
| 5,780,951 A | * | 7/1998 | Stephens .................... 310/172 |
| 6,177,751 B1 | * | 1/2001 | Suzuki et al. ............... 310/269 |
| 6,333,576 B1 | * | 12/2001 | Ishikawa et al. ............. 310/85 |

* cited by examiner

*Primary Examiner*—Thanh Lam
(74) *Attorney, Agent, or Firm*—Posz & Bethards, PLC

(57) ABSTRACT

A core insulator fit on a stacked core is formed in a single unit which has tooth cover pieces and coil bobbin piece. The tooth cover pieces are formed to extend in the radial direction and be spaced apart equi-angularly for covering one axial side surface of the stacked core. The coil bobbin piece extends from the corresponding tooth cover pieces in the axial direction to cover the inner side surfaces of slots of the stacked core. The top ends of the coil bobbin piece protrude from the other axial side surface of the stacked core, when the core insulator is fit on the stacked core.

15 Claims, 5 Drawing Sheets and held in contact with the inner side surface of the slot 15b at an axial side of the stacked core 15.

ROTARY ELECTRIC MACHINE AND MANUFACTURING METHOD THEREFOR

CROSS REFERENCE TO RELATED APPLICATION

This application is based on and incorporates herein by reference Japanese patent application No. 2000-97652 filed Mar. 31, 2000.

BACKGROUND OF THE INVENTION

The present invention relates a rotary electric machine and a manufacturing method for the same, and specifically to an insulation structure between an armature core and a winding of a rotor and an assembling method for the rotor.

In a conventional rotary electric machine, for example a direct current motor, various structures and methods are used to provide insulation between an armature core and a winding which form a rotor. Such methods include painting insulating powders on the core, or disposing an insulator made of paper or insulating resin material between the core and the winding. However, those structures and methods require a number of separate insulating parts and a number of assembling processes.

SUMMARY OF THE INVENTION

It is therefore an object of the present invention to provide a rotary electric machine and a manufacturing method therefor which are effective to reduce the number of insulating parts and the number of assembling processes thereby to improve production costs while ensuring insulation.

According to the present invention, a core insulator is disposed between a stacked core and a winding. The core insulator is formed with a plurality of tooth cover pieces covering one axial side surface of the stacked core, and coil bobbin pieces formed to extend from tooth cover pieces for covering corresponding slot inner side surfaces of the stacked core. The coil bobbin pieces have respective top ends which protrude from the other axial side surface of the stacked core. Preferably, the top ends of the coil bobbin pieces are chamfered to have a curved or tapered surface. Each top end of the coil bobbin pieces is formed with a plurality of cut-outs.

In manufacturing the rotary electric machine, a plurality of core sheets punched out from a metal plate are inserted into the core insulator to form the stacked core. The core sheets are inserted in sequence to form the stacked core. Alternatively, the stacked core is formed by stacking a predetermined number of the core sheets and then inserting the stack of the core sheets.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
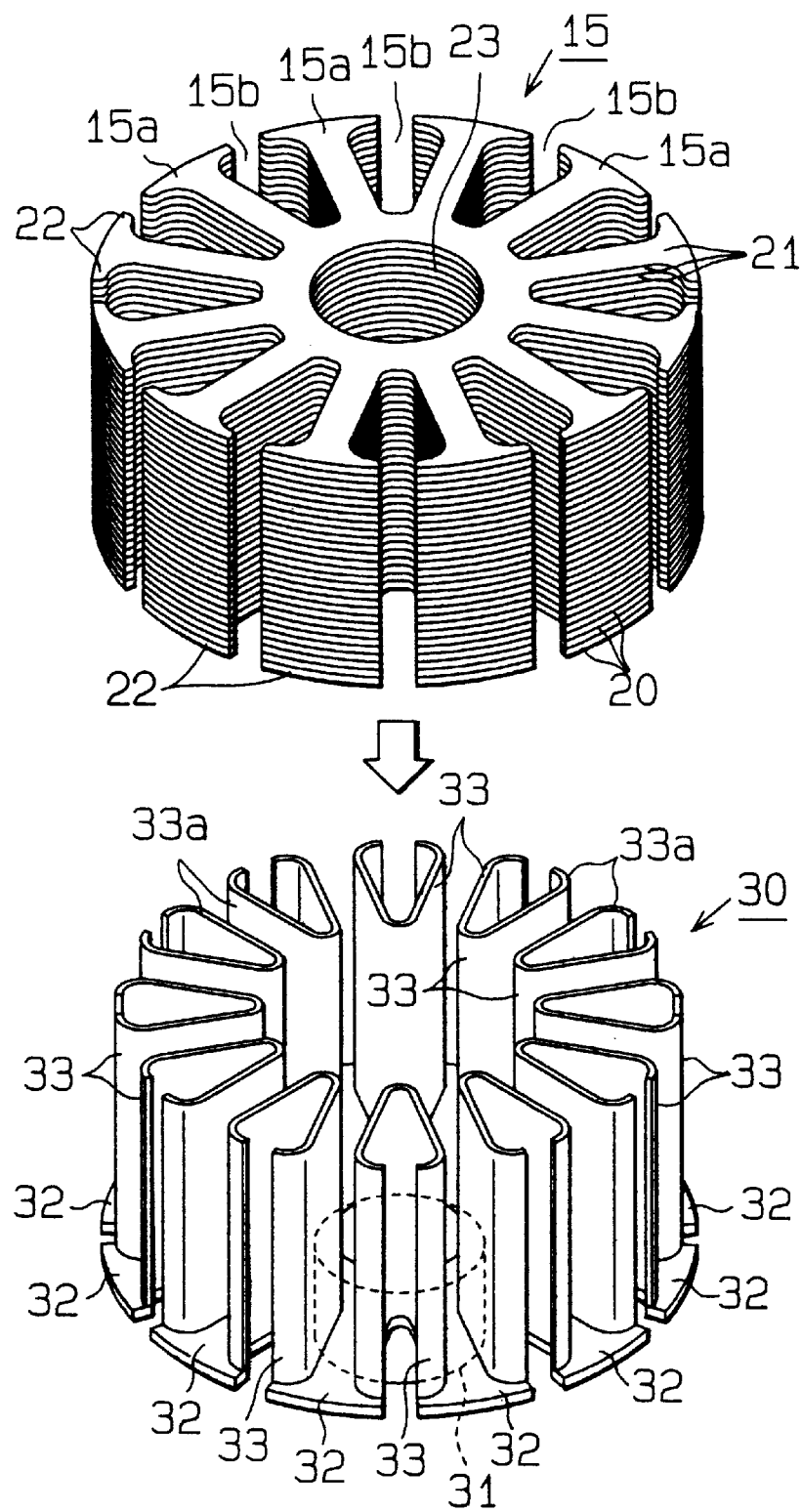
FIG. 1 is a perspective view showing a stacked core and a core insulator according to an embodiment of the present invention.

The present invention will be described in detail with reference to an embodiment shown in FIG. 1 to FIG. 7. This embodiment is directed to an electric motor as a rotary electric machine.

An electric motor 1 has a motor housing 2 which comprises a bottomed cylindrical yoke 3 and an end frame 4. The yoke 3 is formed with a bearing recess 5 at its bottom (right side in the figure), and a bearing 6 is fixed in the bearing recess 5. A pair of magnets 8, 9 are fixed to the inner peripheral side surface of the yoke 3.

The end frame 4 is fixed in the opening of the yoke 3 (left side in the figure), so that an armature 10 as a rotor is accommodated in the space defined by the yoke 3 and the end frame 4. A bearing recess 11 is formed at the central position of the inner side surface 4a of the end frame 4, and a through hole 12 is formed in the bearing recess 11. A bearing 13 is fixed in the bearing recess 11 so that the bearing 13 and the bearing 6 fixed in the yoke 3 rotatably support a rotary shaft 14 of the armature 10.

A stacked core 15 is fixed on the rotary shaft 14 of the armature 10, and a winding 16 is wound on the stacked core 15. The winding ends of the winding 16 are connected to commutator pieces 17a of a commutator 17 fixed to the rotary shaft 14.

The stacked core 15 on which the winding 16 is wound is comprised of a plurality of core sheets 20 as shown in FIG. 1. Each core sheet 20 is formed to have twelve teeth 21 which extend in the radial direction from the central part and are spaced apart equi-angularly in the circumferential direction. Each tooth 21 is formed at its top end with a protrusion 22 which extends arcuately in both side directions. The core sheet 20 is formed with a through hole 23 at its center for passing the rotary shaft 14 therethrough.

The stacked core 15 is formed by stacking a plurality of core sheets 20. The teeth 21 form teeth 15a of the stacked core 15, and spaces provided between adjacent teeth 15a form slots 15b for the winding 16.

Figure 2:
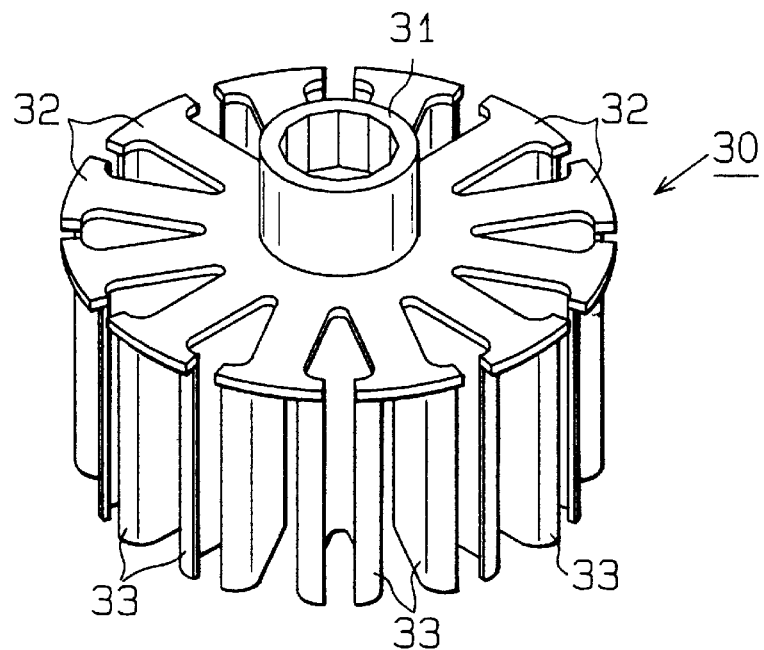
FIG. 2 is a perspective view of the core insulator shown in FIG. 1.

A core insulator 30 shown in FIG. 1 and FIG. 2 is fit in the stacked core 15 comprised of the core sheets 20. The core insulator 30 is an integral mold of an insulating thermoplastic resin. It has a tubular part 31 which is fixed to the rotary shaft 14. Twelve tooth cover pieces 32 are formed to extend radially and equi-angularly at one axial side end of the tubular part 31.

Figure 4:
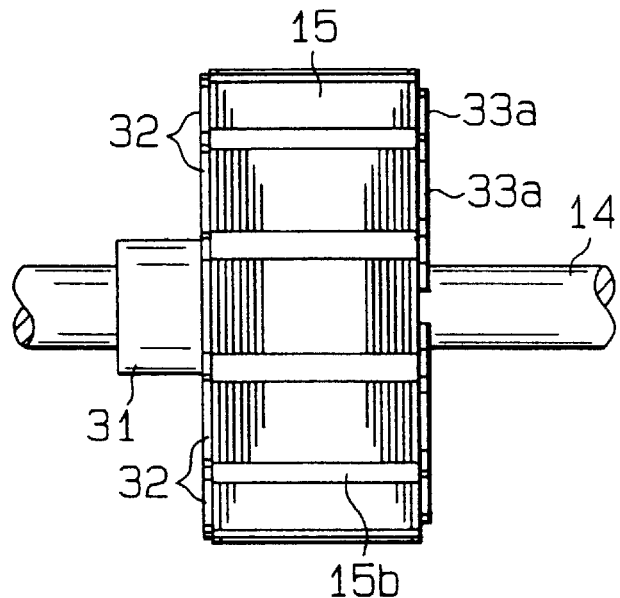
FIG. 4 is a front view showing an assembly of the core insulator and the stacked core.
Figure 6:
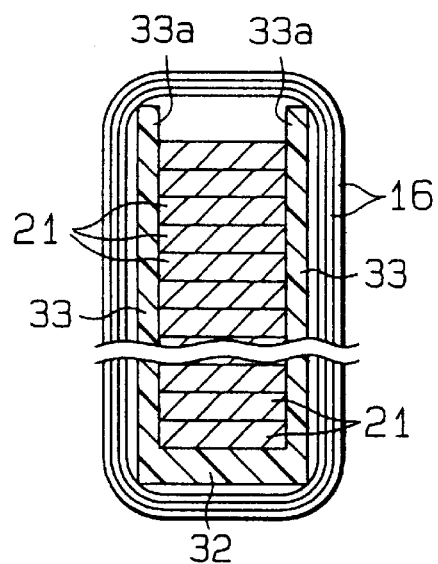
FIG. 6 is a sectional view an assembly of a winding, the stacked core and the core insulator.
Figure 7:
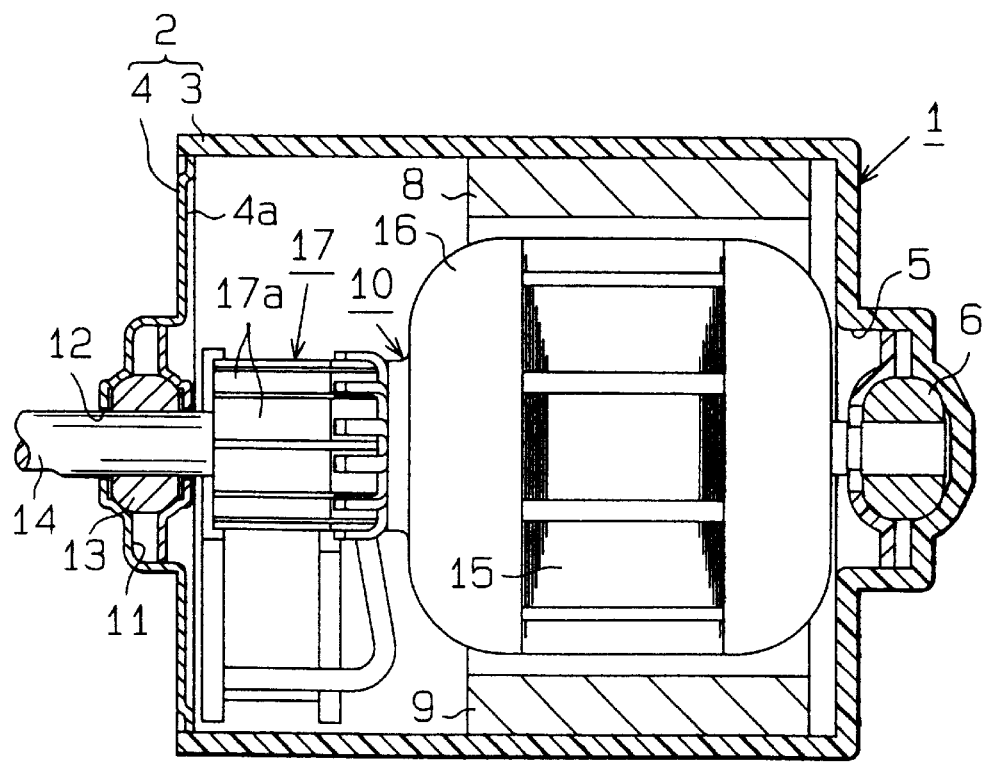
FIG. 7 is a sectional view showing a direct current motor according to the embodiment of the present invention.

Each tooth cover piece 32 is formed in the same shape as each tooth 15a of the stacked core 15. Thus, each space provided between adjacent tooth cover pieces 32 has the same space shape as the slot 15b of the stacked core 15. As a result, as shown in FIG. 4, each tooth cover piece 32 is held in contact with the outer side surface of the tooth 15a of one axial side of the stacked core 15 (bottom side in the figure), when the core insulator 30 is fit on the stacked core 15. Accordingly, as shown in FIG. 6, the winding 16 does not contact the axial side surface of the stacked core 15, when the winding 16 is wound in the slots 15b of the stacked core 15 under the condition that the core insulator 30 has been fit on the stacked core 15.

Figure 5:
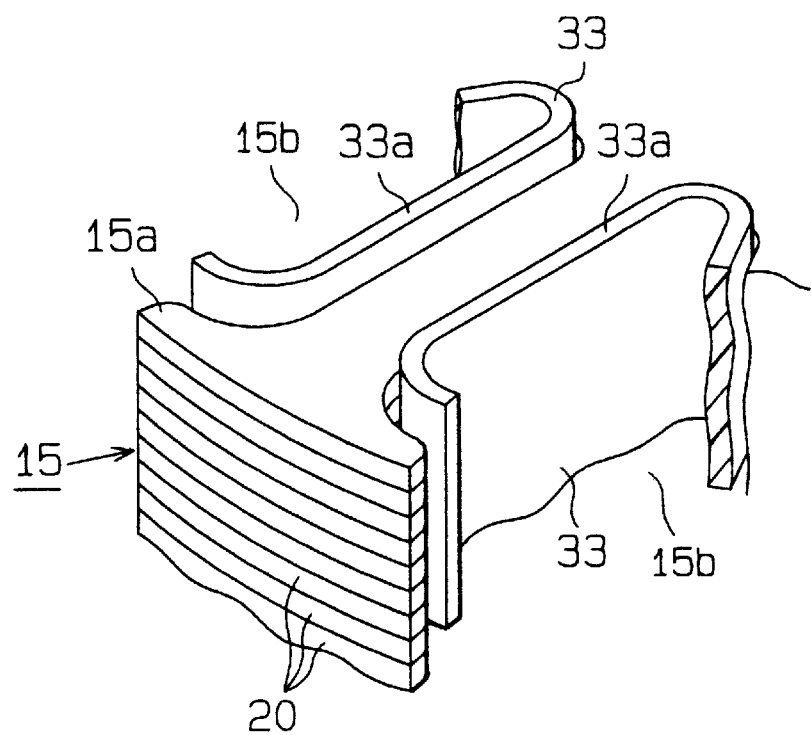
FIG. 5 is perspective view showing a top end of each coil bobbin piece and the stacked core.

At the other axial side of the tooth cover piece 32 opposite the tubular part 31, a plurality of coil bobbin pieces 33 are formed to extend to be inserted in the slots 15b of the stacked core 15, respectively. As shown in FIG. 1, each coil bobbin piece 33 is formed to extend from one outer peripheral part at one side of one tooth cover piece 32 to one outer peripheral part at the other side of adjacent cover piece 32. The coil bobbin piece 33 has the same shape in the planar cross section as that of the inner peripheral surface of the slot 15b formed in the stacked core 15. As a result, when the core insulator 30 has been fit on the stacked core 15 as shown in FIG. 4, each coil bobbin piece 33 is overlaid on the inner peripheral surface of the slot 15b of the stacked core 15 as shown in FIG. 5. Accordingly, as shown in FIG. 6, the winding 16 does not contact the inner peripheral surface of the stacked core 15, when the winding 16 is wound in the slots 15b of the stacked core 15 under the condition that the core insulator 30 has been fit on the stacked core 15.

Figure 3:
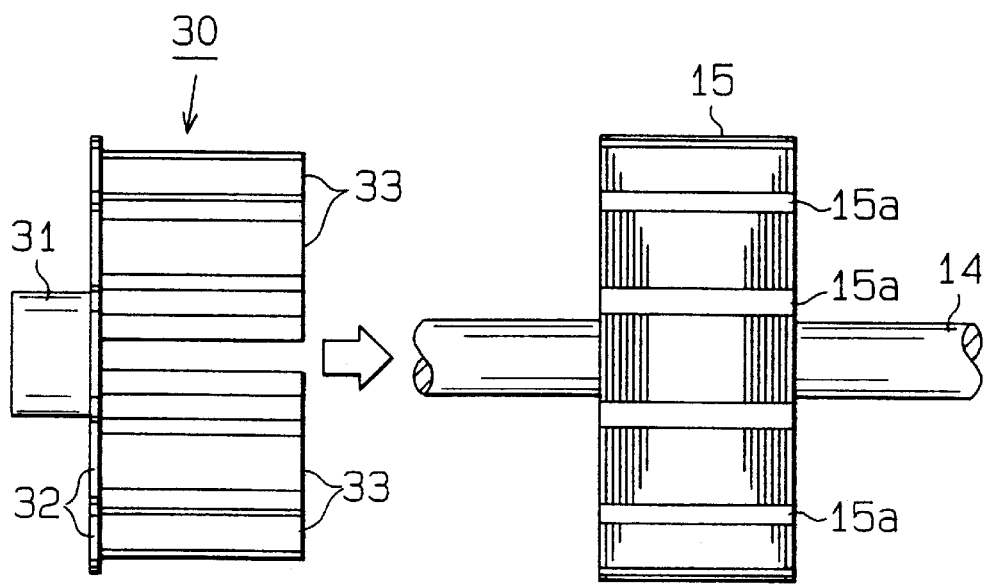
FIG. 3 is a schematic view showing an assembly process in which the core insulator is fit on the stacked core.

Each coil bobbin piece 33 is shaped to have a length (length in the perpendicular direction from the tooth cover piece 32) larger than that of the stacked core 15 in the axial direction of the rotary shaft 14. As a result, the top end 33a of each coil bobbin piece 33 protrudes from the other axial side surface of the stacked core 15 as shown in FIG. 4 to FIG. 6, when the core insulator 30 has been fit on the stacked core 15 from one axial side of the stacked core 15 as shown in FIG. 3. In this embodiment, this protrusion is between 1 mm and 2 mm. Accordingly, as shown in FIG. 6, the winding 16 does not contact the other axial side surface of the stacked core 15, when the winding 16 is wound in the slots 15b of the stacked core 15 under the condition that the core insulator 30 has been fit on the stacked core 15.

The motor 1 as constructed above has the following features.

(1) The teeth 15a at one axial side of the stacked core 15 are covered with the tooth cover pieces 32, and the inner peripheral surfaces of the slots 15b of the stacked core 15 are covered with the coil bobbin pieces 33, when the core insulator 30 is fit on the stacked core 15 in the axial direction as shown in FIG. 3. As a result, the winding 16 is restricted from contacting the one axial side surface of the stacked core 15 and the inner peripheral surfaces of the slots 15b, when the winding 16 is fit on the stacked core 15. Further, the winding 16 is restricted from contacting the other axial side surface of the stacked core 15 when the winding 16 is wound in the stacked core 15, because the top ends 33a of the coil bobbin pieces 33 protrude from the other axial side surfaces of the stacked core 15. Accordingly, the core insulator 30 ensures insulation for the winding 16 of the stacked core 15.

(2) The core insulator 30 is formed in a single unit, and is fit on the stacked core 15 by sliding its tubular part 31 onto the rotary shaft 14 and inserting the core insulator 30 into the slots 15b of the stacked core 15 in the axial direction of the stacked core 15. Accordingly, the number of parts is reduced to one thereby reducing costs and the number of assembling processes.

(3) The core insulator 30 is fit from one axial side surface of the stacked core 15, that is, from the surface which is opposite the side where the commutator 17 is fixed. As a result, the core insulator 30 can be fit at any time points which may be before or after fixing the commutator 17 on the rotary shaft 14, under the condition that the stacked core 15 is fixed on the rotary shaft 14. Accordingly, the flexibility of manufacturing process can be increased and the manufacturing efficiency can be improved.

(4) The core insulator 30 in a single unit is fit from one axial side surface of the stacked core 15. As a result, each coil bobbin piece 33 of the core insulator 30 supports the core sheets 20 while contacting the inner side surfaces of the slots 15b of the stacked core 15 so that the core sheets 20 forming the stacked core 15 are not displaced. Therefore it is not necessary to fixedly couple the core sheets 20 to each other by crimping or the like so that the core sheets 20 are not displaced from each other. As a result, in forming the stacked core 15, the process for fixedly coupling the core sheets 20 by crimping or the like can be eliminated and the manufacturing efficiency can be improved. Further, the core loss caused by the crimping process can be minimized.

The above embodiment may be modified as follows.

Figure 8:
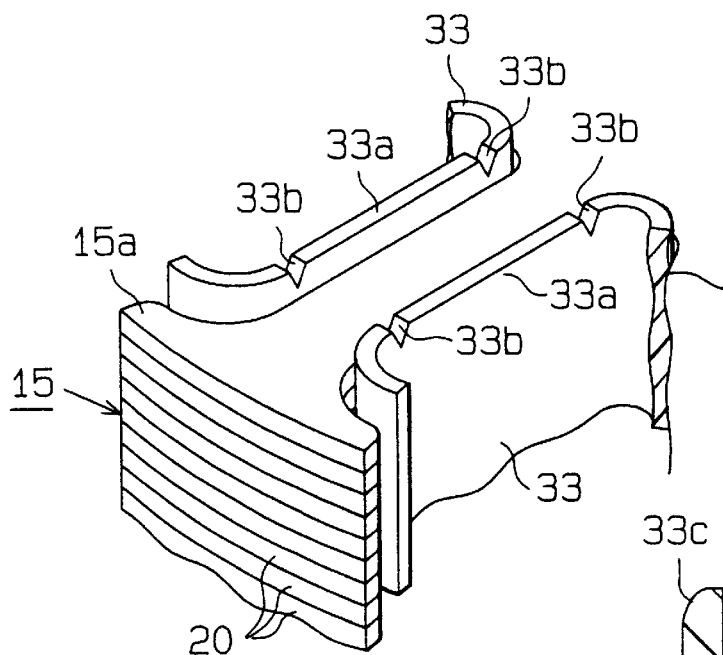
FIG. 8 is a perspective view showing a modification of the top end of the coil bobbin piece.

As shown in FIG. 8, the coil bobbin piece 33 may be formed with a pair of cut-outs 33b at the top end 33a. In this instance, the top end 33a between the pair of cut-outs 33b is made to be more resilient. Accordingly, the top end 33a is less likely to damage insulating film (enamel, etc.) coated over the winding 16, when the winding 16 is wound around each tooth 15.

Figure 9A:
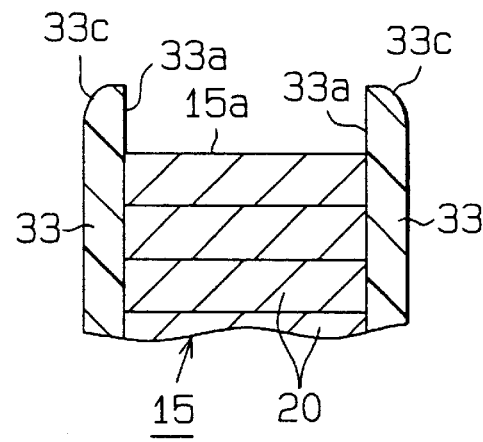
FIG. 9A, FIG. 9B and FIG. 9C are sectional views showing modifications of the top end of the coil bobbin piece.
Figure 9B:
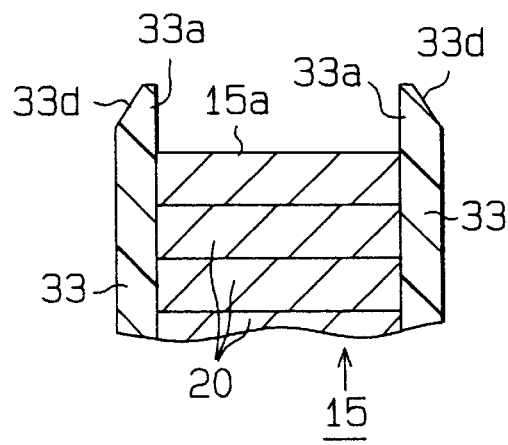

The corners of the top end 33a may be chamfered into curved surfaces 33c as shown in FIG. 9A, or into tapered surfaces 33d as shown in FIG. 9B. In these instances, the chamfered part is less likely to damage the insulating film (enamel, etc.) coated over the winding 16. It is also possible to chamfer the top end 33a of the coil bobbin piece 33 in the case of the modification shown in FIG. 8.

Figure 9C:
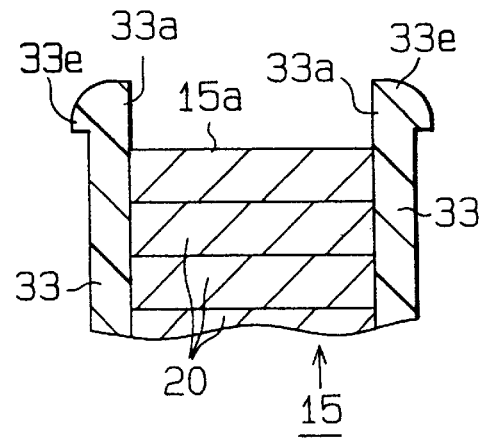

The corners of the top ends 33a may also be formed with respective protrusions 33e at a position axially outside the axial side surface of the stacked core 15 as shown in FIG. 9C. The protrusion 33e protrudes in the slot direction so that the surface area of contact with the winding 16 may be increased to restrict damage to the winding 16. As the protrusion 33e is provided at the top end 33a, it may be formed when the core insulator 30 is injection-molded without difficulty because a die for the injection molding can be moved in the axial direction of the armature 10. As the protrusion 33e is provided axially outside the top surface of the stacked core 15, the top end 33a is likely to be bent toward the stacked core side when the winding 16 is tightened in the slot 15b. As a result, the stacked core 15 is tightly stacked.

The core insulator 30 may be fit on the stacked core 15 from the axial side surface where the commutator is fixed, although the core insulator 30 is fit from one side of the stacked core 15, that is, from the axial side which is opposite the side where the commutator 17 is fixed.

The core insulator 30 may be fit on the stacked core 15 before fixing the stacked core 15 on the rotary shaft 14, although the core insulator 30 is fit after fixing the stacked core 15 on the rotary shaft 14. That is, the stacked core 15 on which the core insulator 30 has been fit may be fixed on the rotary shaft 14. In this instance, a predetermined number of (a plurality of) core sheets 20 which have been punched out from a metal plate are stacked first and then slid into the core insulator 30. Alternatively, the core sheets 20 may be slid into the core insulator 30 one by one, thereby stacking to the predetermined number of core sheets. In this instance, the core sheets 20 do not displace, because each coil bobbin piece 33 supports the tooth pieces 21 of the core sheets 20.

As a result, it is only necessary to sequentially insert the core sheets 20 to a stack of the predetermined number of sheets 20 without fixedly coupling the core sheets 20 to each other by crimping and the like.

The stacked core 15 on which the core insulator 30 has been fit is press-fixed to the rotary shaft 14. Accordingly, in this instance also, the process of fixedly coupling the core sheets 20 to each other by crimping and the like can be obviated. Further, in constructing a manufacturing line, it is only necessary to supply a single unit of the core insulator 30 to the manufacturing line by integrating the core sheets 20 and the core insulator 30 in the preceding process.

It is to be noted that, in sequentially inserting the core sheets 20 into the core insulator 30 to a stack of the predetermined number of core sheets, each core sheet 20 sequentially punched out from a punching machine is preferably inserted by displacing by an angle of one slot from the preceding one, or by displacing by an angle of a plurality of slots within a range in which the core sheet 20 is not rotated to make one complete rotation. That is, the core sheets 20 punched out from the metal plate vary from sheet to sheet due to variations in the thickness of the metal plate or in punching accuracy of the punching machine. To compensate for the variations, it is preferred to insert the core sheet 20 by displacing one slot from the precedingly inserted core sheet 20 or by displacing a plurality of slots within a range of one complete rotation. As the variations are thus compensated for, the imbalance of the armature 10 in rotation can be reduced. Accordingly, it becomes possible to minimize the amount of putty attached to compensate for the imbalance or the amount of cutting of the outer peripheral part of the stacked core 15.

The present invention should not be limited to the direct current motor, but may be directed to other types of motors or generators as long as they are rotary electric machines having a rotor in which a winding is wound on a stacked core fixed to a rotary shaft.

What is claimed is:

1. A rotary electric machine comprising:
    a stacked core having slots;
    a core insulator fit on the stacked core; and
    a winding wound in the slots of the stacked core through the core insulator,
    wherein the core insulator integrally has:
        a plurality of tooth cover pieces covering one axial side surface of the stacked core;
        coil bobbin pieces formed to extend from the tooth cover pieces for covering corresponding slot inner side surfaces of the stacked core, respectively, and to have top ends which protrude from the other axial side surface of the stacked core; and
        wherein the winding is wound to cross each top end of the coil bobbin pieces without contacting the other axial side surface of the stacked core.

2. The rotary electric machine as in claim 1, wherein the top ends of the coil bobbin piece are chamfered to protect the winding from being damaged.

3. The rotary electric machine as in claim 2, wherein each top end of the coil bobbin piece are chamfered to a curved surface.

4. The rotary electric machine as in claim 2, wherein each top end of the coil bobbin piece is chamfered to a tapered surface.

5. The rotary electric machine as in claim 1, wherein the top end of the coil bobbin piece is formed with a plurality of cut-outs, and the winding is wound to cross the top end between the cut-outs.

6. The rotary electric machine as in claim 1, further comprising:
    a commutator fixed on the rotary shaft at an axial side opposite the other axial side where the tooth cover pieces are located.

7. The rotary electric machine as in claim 1, wherein the tooth cover pieces and the stacked core are tightly stacked to each other by the winding.

8. The rotary electric machine as in claim 1, wherein each top end of the coil bobbin pieces is formed with a protrusion protruding into the slot to protect the winding from being damaged.

9. The rotary electric machine as in claim 8, wherein the top end is formed at a position which is axially outside the other axial side surface of the stacked core.

10. A rotary electric machine comprising:
    a stacked core having slots and supported rotatably;
    a core insulator fit on the stacked core; and
    a winding wound in the slots of the stacked core through the core insulator,
    wherein the core insulator integrally has:
        a plurality of tooth cover pieces covering one axial side surface of the stacked core;
        coil bobbin pieces formed to extend from the tooth cover pieces for covering corresponding slot inner side surfaces of the stacked core, respectively, and to have top ends which protrude from the other axial side surface of the stacked core; and
    wherein the winding is prevented from contacting the one and the other axial side surface of the stacked core by the tooth cover pieces and the top ends of the coil bobbin pieces.

11. The rotary electric machine as in claim 10, wherein the top ends of the coil bobbin piece are formed with two cut-outs, and the winding is wound to cross the top end between the cut-outs.

12. The rotary electric machine as in claim 10, further comprising:
    a rotary shaft for supporting the stacked core; and
    a commutator fixed on the rotary shaft at an axial side opposite the other axial side where the tooth cover pieces are located.

13. The rotary electric machine as in claim 10, wherein the stacked core and the tooth cover pieces are fixedly aligned with each other by the winding.

14. The rotary electric machine as in claim 10, wherein each top top end of the coil bobbin pieces is formed with a protrusion extending into the slot and having an axial cross section arranged to protect the winding from being damaged.

15. The rotary electric machine as in claim 14, wherein the top end is formed at a position which is axially beyond the other axial side surface of the stacked core.

* * * * *